(12) United States Patent
Forrest

(10) Patent No.: US 10,174,862 B2
(45) Date of Patent: Jan. 8, 2019

(54) QUICK DISCHARGE FAUCET VALVE

(71) Applicant: Joseph Forrest, Macedonia, OH (US)

(72) Inventor: Joseph Forrest, Macedonia, OH (US)

( * ) Notice: Subject to any disclaimer, the term of this patent is extended or adjusted under 35 U.S.C. 154(b) by 64 days.

(21) Appl. No.: 15/468,092

(22) Filed: Mar. 23, 2017

(65) Prior Publication Data

US 2018/0274693 A1    Sep. 27, 2018

(51) Int. Cl.
*F16K 35/00* (2006.01)
*F16K 35/02* (2006.01)
*F16K 31/60* (2006.01)
*F16K 25/00* (2006.01)

(52) U.S. Cl.
CPC .......... *F16K 35/027* (2013.01); *F16K 25/005* (2013.01); *F16K 31/60* (2013.01)

(58) Field of Classification Search
CPC ........ F16K 25/005; F16K 31/60; F16K 35/00; F16K 35/027
See application file for complete search history.

(56) References Cited

U.S. PATENT DOCUMENTS

| | | | | | |
|---|---|---|---|---|---|
| 4,419 A | * | 3/1846 | Clarke | ................. | B65D 83/205 251/100 |
| 763,263 A | * | 6/1904 | Cooke | ................. | B65D 83/205 251/100 |
| 946,249 A | * | 1/1910 | Meyer | ................. | B65D 83/205 251/100 |
| 1,271,625 A | * | 7/1918 | Snyder | ................. | B65D 83/205 251/100 |
| 1,888,130 A | * | 11/1932 | Huffman | ................. | F16K 27/02 251/100 |
| 2,649,768 A | * | 8/1953 | Anderson | ................. | E03B 9/14 137/304 |
| 6,279,610 B1 | * | 8/2001 | Fan | ..................... | F16K 11/0712 251/100 |
| 8,402,991 B2 | * | 3/2013 | Wu | .......................... | E03B 7/12 137/301 |

* cited by examiner

*Primary Examiner* — Eric Keasel

(57) ABSTRACT

A quick discharge faucet valve includes a shaft, a seal assembly, a coupling member, and a rotary handle. The shaft is inserted through an opening of a pipe, and a valve opening is positioned near a discharge opening of the faucet. The seal assembly is fastened to the shaft to abut against a joint connecting the faucet to the pipe, which is releasably positioned at the joint via a spring member. The coupling member is disposed at an outer end of the shaft to couple the faucet with the rotary handle. A first interlocking member of the rotary handle interlocks with a second interlocking member of the coupling member. The rotary handle is rotated to unlock the interlocking members and pulled to release the seal assembly from the joint to allow the fluid to flow around the shaft and discharge at the discharge opening of the faucet.

7 Claims, 5 Drawing Sheets

QUICK DISCHARGE FAUCET VALVE

FIELD OF THE INVENTION

The present invention relates to valve devices used for quick discharging of a fluid. More particularly, the present invention relates to a quick discharge faucet valve configured to quickly discharge the fluid with a quick turn and pull of a valve handle.

BACKGROUND

Shut-off valves, in general, are used for home applications where these valves are fitted to faucets in the interior and exterior of the building. They find extensive applications in bathroom faucets, as well as exterior gardening faucets. Conventionally, most of such shut-off valves, and its interior components, for example, the bonnet, body, stem, plug, etc., are made of metal. Such construction of the shut-off valves using metals improved the ruggedness of construction, but faced some disadvantages. The conventional shut-off valves made of metal tends to corrode over a period due to rust and ageing. The turning on and or off operation of the existing house faucet becomes more difficult as time goes on. Corroding of the metal can also result in impurities being dissolved in the water, which can cause harm to the users.

Another issue with the conventional shut-off valves, which use rotary handles, is the difficulty in rotating the handle during regular usage due to the rusting, or corroding of the surfaces. The continuous twisting of the handle can also result in damage to the internal rubber washers as well. The conventional shut-off valves also face the problem of aging which deteriorates the ruggedness of the equipment over a time. This results in frequent replacement of the shut-off valves, which is expensive. This is because the metallic shut off valves itself are expensive, and additional plumbing charges must be taken into consideration to maintain or replace such shut-off valves.

Therefore, there is a need for a valve device which can quick-discharge water without turning the handles multiple times. A device which can be operated using a single push or pull which will discharge the water, as well as whose components that are non-corrosive and anti-aging with time and climatic changes.

SUMMARY OF THE INVENTION

The quick discharge faucet valve relates to the internal working of the indoor or outdoor house faucets, as well as its interior shut off valves, which are installed throughout the house. The quick discharge faucet valve is a device is which an external faucet and its shut-off valves can be turned on or off selectively. The quick discharge faucet valve is a lockable device, which allows a user to remove the exciting inner core of the outdoor faucet and insert the quick discharge faucet valve inside the exciting core. The quick discharge faucet valve is a pull-on system, which delivers water through the exciting spout with one easy pull of a rotary handle. The quick discharge faucet valve replaces the current conventional devices which are difficult to operate, and which age with reduced efficiency. A significant portion of the quick discharge faucet valve is generally made of plastic, and the rest with metal. The quick discharge faucet valve further comprises a solid adjustable shaft, which can apply a pressure to a washer to restrict incoming water flow.

The quick discharge faucet valve is configured to discharge water from a faucet connected to a pipe carrying the water. The quick discharge faucet valve comprises the shaft, the seal assembly, the coupling member, and the rotary handle. The shaft is inserted through an opening of the pipe, and a valve opening is positioned proximal to a discharge opening of the faucet. The seal assembly is fastened at an inner distal end of the shaft, and the seal assembly abuts against a joint connecting the faucet to the pipe, or in other words, the seal assembly seals the joint between the faucet and the pipe. The seal assembly is releasably positioned at the joint via a spring member, so that the seal assembly can be released or opened when the shaft is being pulled out. The coupling member is disposed at the outer distal end of the shaft to couple the faucet with a rotary handle. The coupling member has threaded sections to couple the faucet with the rotary handle.

The rotary handle is fastened to the coupling member, and the rotary handle further comprises a first interlocking member extending from the rotary handle, for example, the first interlocking member is an L shaped flanged extension, which defines a lockable arm. The coupling member also comprises a second interlocking member, which extends from the body of the coupling member, which is similar in shape to the first interlocking member. The first interlocking member is, therefore selectively interlocks with the second interlocking member according to the rotation of the rotary handle. Now, the rotary handle is rotated to unlock the first interlocking member and the second interlocking member, and then the rotary handle is pulled to release the shaft and the seal assembly from the joint. The pulling of the rotary handle allows water to flow around the shaft, and further allows water to be discharged at the discharge opening of the faucet.

In an embodiment, the water flow through the faucet is closed by pushing and rotating the rotary handle to lock the first interlocking member and the second interlocking member, so that the shaft is pushed against the seal assembly to seal the flow of water. In an embodiment, the seal assembly comprises a pair of steel washers sandwiching a rubber washer therebetween. In an embodiment, the quick discharge faucet valve further comprises a first sleeve fastened to the outer distal end of the shaft via a threaded nut. The first sleeve is configured to house the spring member and the seal assembly.

In an embodiment, the quick discharge faucet valve further comprises an adjustable bolt engaged within the threaded nut. The adjustable bolt extends the shaft towards the seal assembly and applies pressure on the pair of steel washers sandwiching the rubber washer. In an embodiment, the quick discharge faucet valve further comprises a coupling seal positioned adjacent to the coupling member, and the coupling seal is inserted over the shaft. The coupling seal comprises a pair of steel washers, which sandwich a rubber washer therebetween. In an embodiment, the quick discharge faucet valve further comprises a second sleeve positioned on the shaft, and positioned adjacent to the coupling seal. The second sleeve prevents the shaft from penetrating through the coupling seal.

In an embodiment, the quick discharge faucet valve further comprises a shaft of a predefined length to be inserted into the valve opening of the faucet of shorter length, for example, the shaft used here is of a shorter length, which is inserted into shorter faucet. This type of short shaft is generally used for applications where the faucet length is short, and this shaft applies pressure against the seal assembly to selectively discharge water through the discharge opening of the short faucet. The opening and closing of the rotary handle allows the selective discharge of water through the discharge opening.

DETAILED DESCRIPTION OF THE INVENTION

Figure 1:
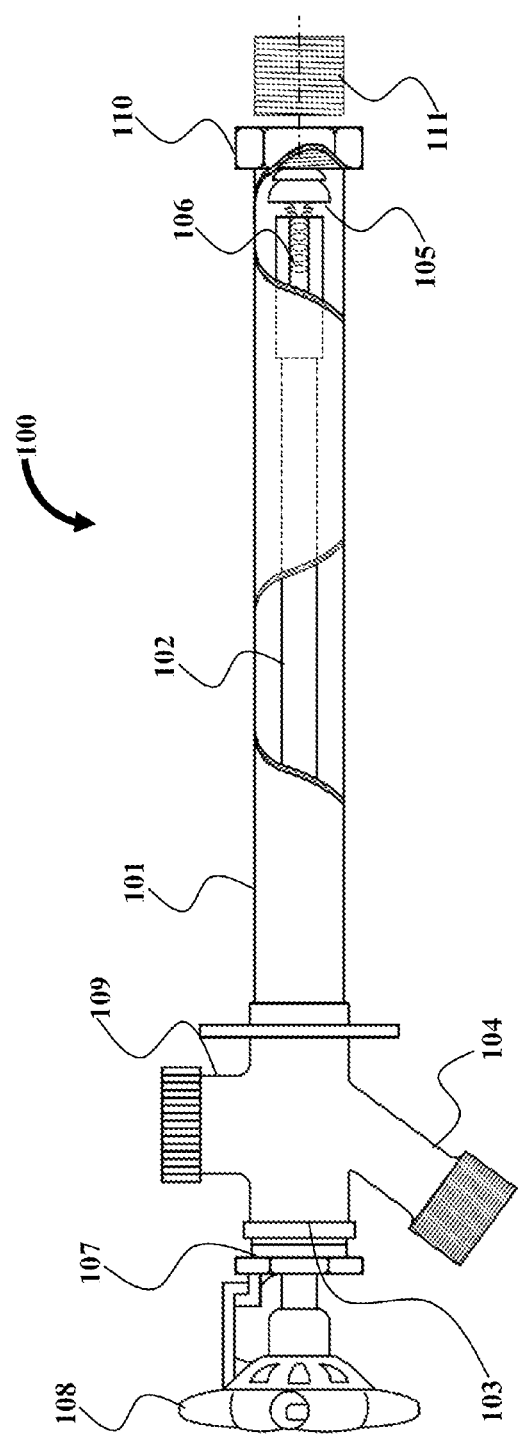
FIG. 1 exemplarily illustrates a front perspective view of the quick discharge faucet valve, showing a partial internal view of the quick discharge faucet valve.
Figure 2A:
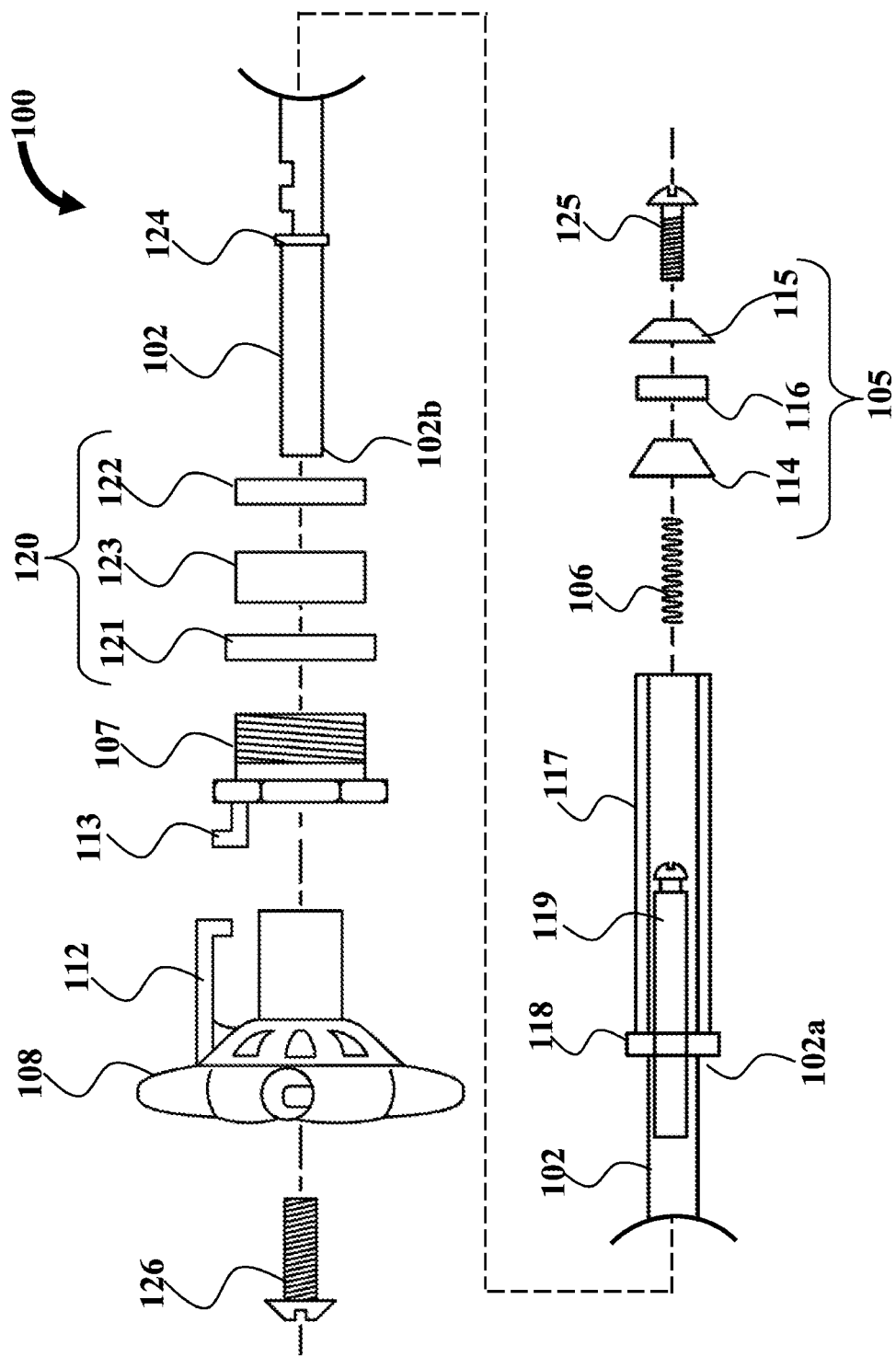
FIG. 2A exemplarily illustrates an exploded view of the quick discharge faucet valve.

FIG. 1 exemplarily illustrates a front perspective view of the quick discharge faucet valve 100, showing a partial internal view of the quick discharge faucet valve 100. The quick discharge faucet valve 100 mainly comprises a shaft 102, a seal assembly 105, a coupling member 107, and a rotary handle 108. The quick discharge faucet 101 is configured to be inserted into the conventional faucet 101 to discharge the fluid quickly with just one push of the rotary handle 108. An example of the fluid is water; therefore, hereinafter 'fluid' is referred to as 'water' in the following description. The faucet 101 is threadedly engaged to the pipe 111 carrying water via a nut to form a joint 110. The shaft 102 is housed within the faucet 101 and the shaft 102 is sealed against the joining point, or the joint 110 of the faucet 101 and pipe 111 via the seal assembly 105. A valve body 109 or bonnet is fastened at an outer distal end 102b of the shaft 102 and faucet 101 as shown in FIG. 2A, where the valve body 109 allows the positioning of the coupling member 107 and the rotary handle 108. The coupling member 107 is connected to a valve opening 103, and then the rotary handle 108 is fastened to the coupling member 107. The selective locking and interlocking between the rotary handle 108 and the coupling member 107 allows the water to be discharged through the discharge opening 104, as further described in FIGS. 2A-2B.

Figure 2B:
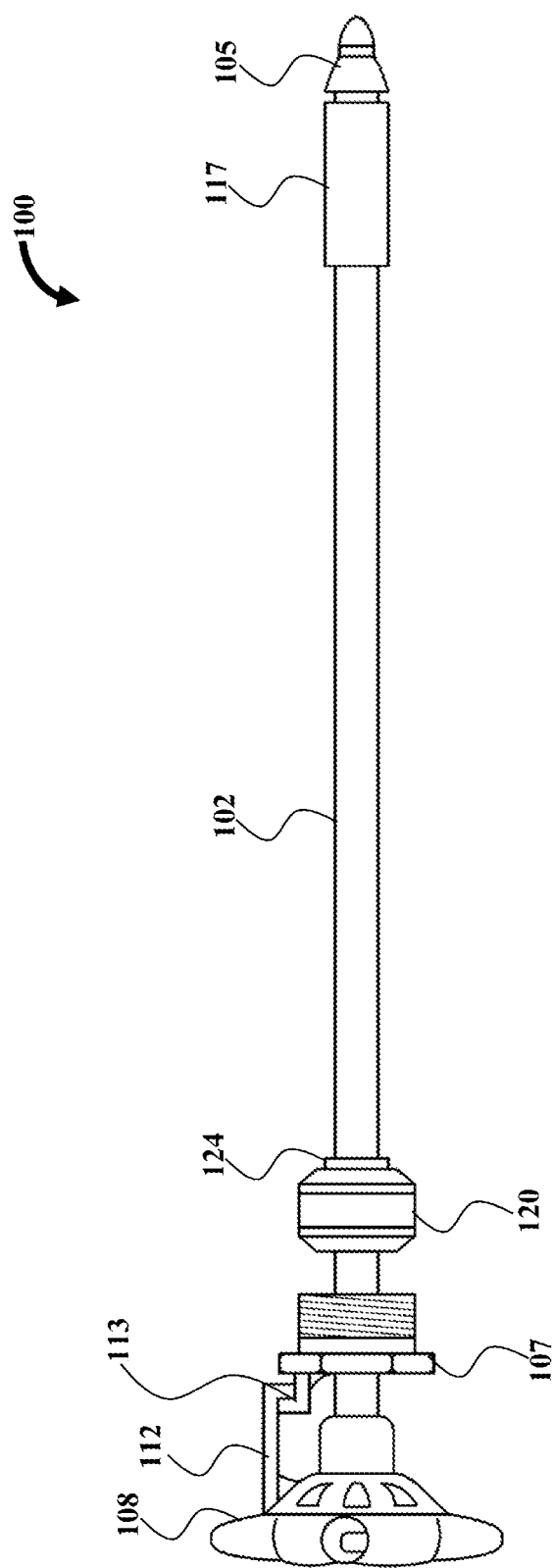
FIG. 2B exemplarily illustrates an assembled view of the quick discharge faucet valve, with respect to FIG. 2A.

FIG. 2A exemplarily illustrates an exploded view of the quick discharge faucet valve 100. FIG. 2B exemplarily illustrates an assembled view of the quick discharge faucet valve 100, with respect to FIG. 2A. The quick discharge faucet valve 100 is configured to discharge water from a faucet 101 connected to a pipe 111 carrying the water as described in FIG. 1. The shaft 102 is inserted through an opening of the pipe 111, and the valve opening 103 is positioned proximal to a discharge opening 104 of the faucet 101 as described in FIG. 1. The seal assembly 105 is fastened at the inner distal end 102a of the shaft 102 via the fastener 125, and the seal assembly 105 abuts against a joint 110 connecting the faucet 101 to the pipe 111, or in other words, the seal assembly 105 seals the joint 110 between the faucet 101 and the pipe 111 as described in FIG. 1.

The seal assembly 105 is releasably positioned at the joint 110 via a spring member 106, so that the seal assembly 105 can be released or opened when the shaft 102 is being pulled out. The releasable positioning of the seal assembly 105 is established via the compressive tension in the spring member 106, which responds to the change in the movement of the shaft 102. The coupling member 107 is disposed at the outer distal end 102b of the shaft 102 to couple the faucet 101 with a rotary handle 108 as shown in FIG. 1. The faucet 101 can be any conventional faucet arrangement, and the quick discharge faucet valve 100 is constructed to be inserted into any diameter of the conventional faucet. The coupling member 107 has threaded sections to couple the faucet 101 with the rotary handle 108. The coupling process, in each case, can be performed via a pipe wrench.

Referring to FIG. 1, and FIGS. 2A-2B, the rotary handle 108 is fastened to the coupling member 107 via a fastener 126. The rotary handle 108 further comprises a first interlocking member 112 extending from the rotary handle 108, for example, the first interlocking member 112 is an L shaped flanged extension which defines a lockable arm. The coupling member 107 also comprises a second interlocking member 113, which extends from the body of the coupling member 107, which is similar in shape to the first interlocking member 112. The first interlocking member 112, therefore selectively interlocks with the second interlocking member 113 according to the rotation of the rotary handle 108. Now, the rotary handle 108 is rotated to unlock the first interlocking member 112 and the second interlocking member 113, and then the rotary handle 108 is pulled to release the shaft 102 and the seal assembly 105 from the joint 110 as shown in FIG. 1. Water flows around the shaft 102 as the rotary handle 108 is pulled, and further, water discharges at the discharge opening 104 of the faucet 101 as shown in FIG. 1.

In an embodiment, the water flow through the faucet 101 is closed by pushing and rotating the rotary handle 108 to lock the first interlocking member 112 and the second interlocking member 113, so that the shaft 102 is pushed against the seal assembly 105 to seal the flow of water. When a user wants to quickly stop the water flow in the faucet 101, he/she can turn the rotary handle 108 to quick-lock the flow of water. In general, the user has to rotate the rotary handle 108 in an anticlockwise direction to unlock the first interlocking member 112 from the second interlocking member 113, and then the user has to rotate the rotary handle 108 in a clockwise direction to quick-lock the first interlocking member 112 to the second interlocking member 113 to stop the flow of water.

In an embodiment, the seal assembly 105 comprises a pair of steel washers 114 and 115 sandwiching a rubber washer 116 therebetween. The quick discharge faucet valve 100 further comprises an adjustable bolt 119 engaged within the threaded nut 118. The adjustable bolt 119 extends the shaft 102 towards the seal assembly 105 and applies pressure on the pair of steel washers 114 and 115 sandwiching the rubber washer 116. Here, when the shaft 102 applies pressure on the seal assembly 105, the pressure does not damage the seal assembly 105 because the rubber washer 116, which is positioned between the steel washers 114 and 115, absorbs the pressure. Conventionally, most valve components apply pressure directly on the rubber made washers, which damage the washers, as well as the entire equipment. However, the design of the quick discharge faucet valve 100 overcomes this issue by sandwiching the rubber washer 116 between the steel washers 114 and 115. In an embodiment, the quick discharge faucet valve 100 further comprises a first sleeve 117 fastened to the outer distal end 102b of the shaft 102 via a threaded nut 118. The first sleeve 117 is configured to house the spring member 106 and the seal assembly 105. The first sleeve 117 further prevents the thrusting of the shaft 102 past the joint 110.

In an embodiment, the quick discharge faucet valve 100 further comprises a coupling seal 120 positioned adjacent to the coupling member 107, and the coupling seal 120 is inserted over the shaft 102. The coupling seal 120 comprises a pair of steel washers 121 and 122, which sandwich a rubber washer 123 therebetween. In an embodiment, the quick discharge faucet valve 100 further comprises a second sleeve 124 positioned on the shaft 102, and positioned adjacent to the coupling seal 120. The second sleeve 124 prevents the shaft 102 from penetrating through the coupling seal 120. The steel washers 121 and 122, which sandwich the rubber washer 123, absorb the reverse pressure applied from the shaft 102 while opening the water flow, and further prevents the thrusting of the shaft 102 past the coupling seal 120.

Figure 3:
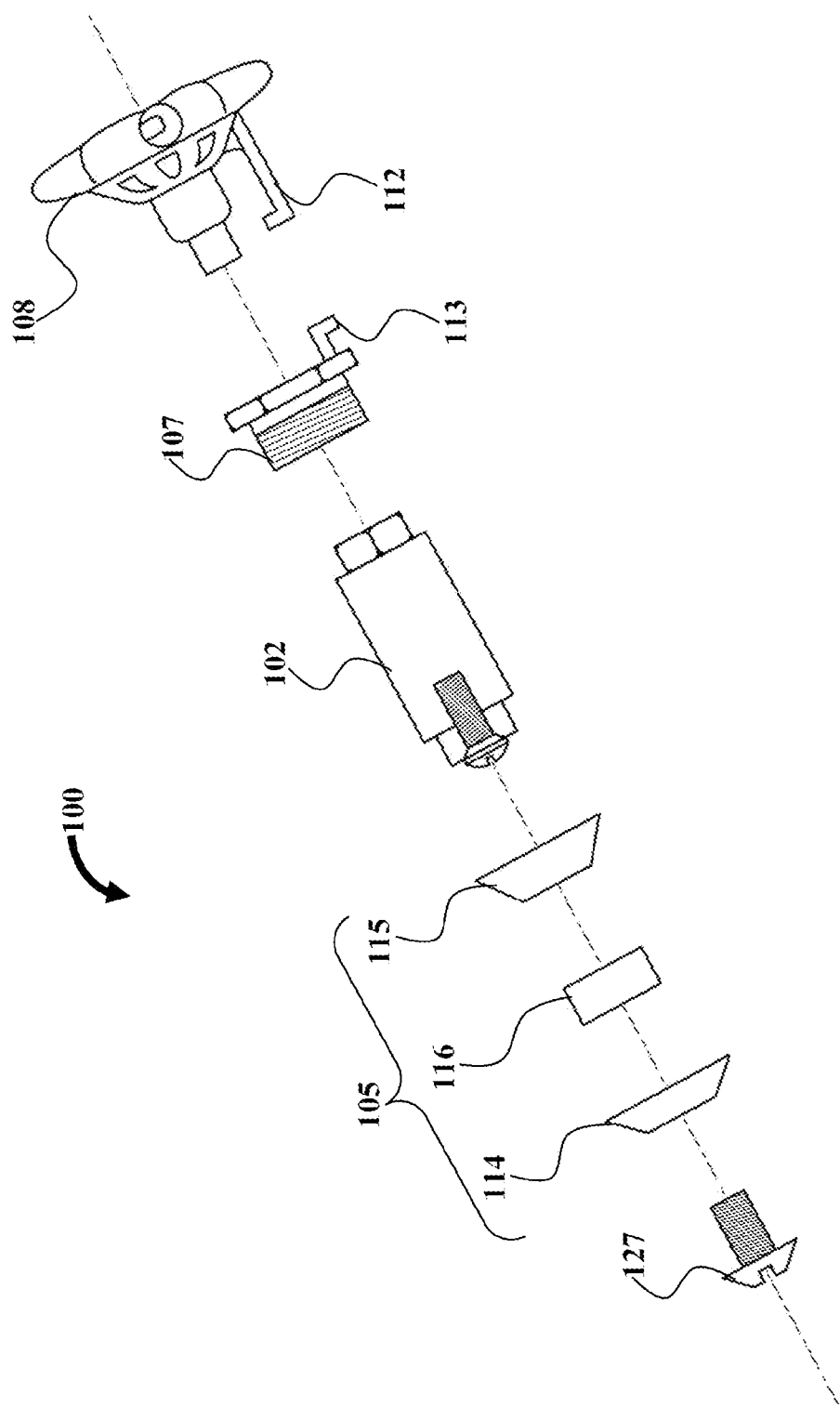
FIG. 3 exemplarily illustrates an exploded view of the quick discharge faucet valve used in short faucets.
Figure 4:
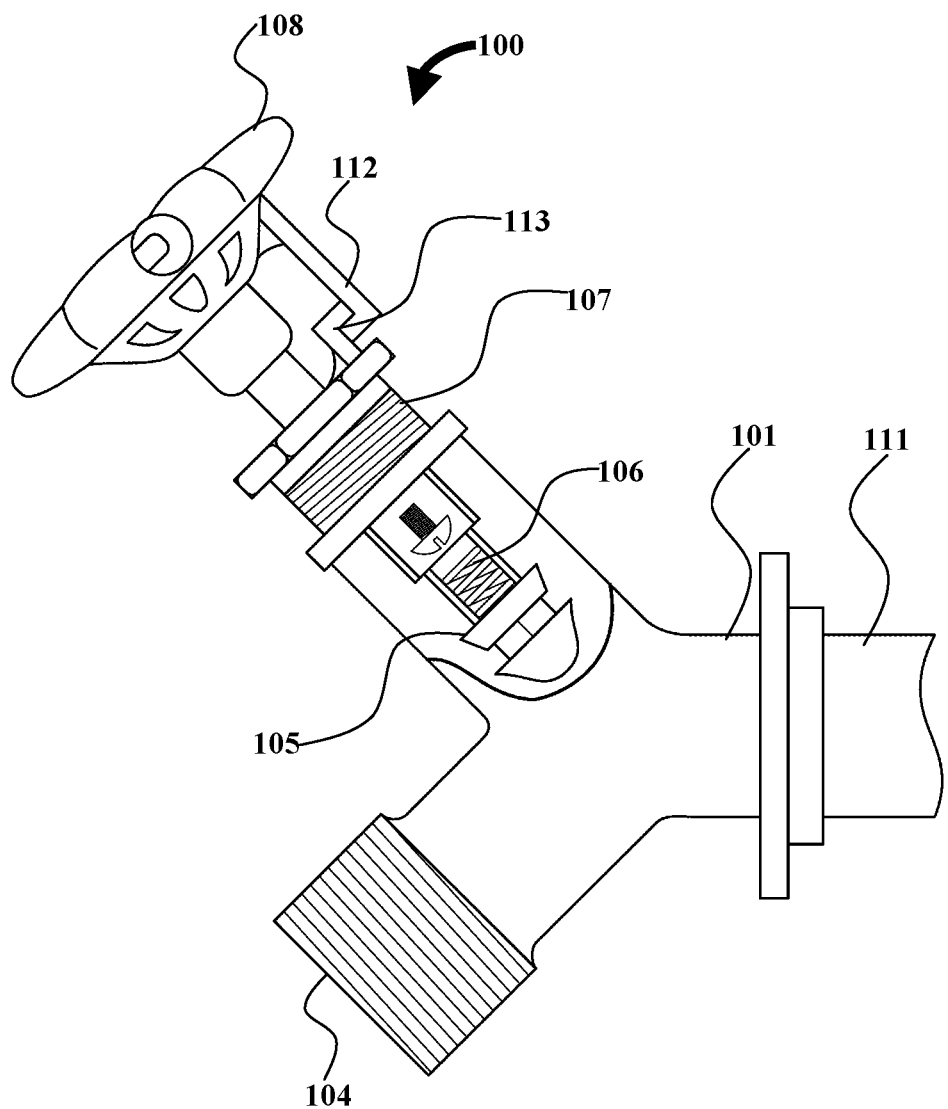
FIG. 4 exemplarily illustrates an embodiment of the shorter quick discharge faucet valve shown in FIG. 3 which is inserted into the faucet of shorter length.

FIG. 3 exemplarily illustrates an exploded view of the quick discharge faucet valve 100 used in short faucets 101. The main components of the quick discharge faucet valve 100 are the same as that of the longer quick discharge faucet valve 100 described in FIG. 1. The main difference is the length of the shaft 102, which is substantially less compared to the embodiment in FIG. 1, since this quick discharge faucet valve 100 is designed to be used in short faucets 101 as shown in FIG. 4. The seal assembly 105 comprising the pair of steel washers 114 and 115 sandwiching the rubber washer 116, are fastened to the short shaft 102 via a fastener 127.

FIG. 4 exemplarily illustrates an embodiment of the shorter quick discharge faucet valve 100 shown in FIG. 3 which is inserted into the faucet 101 of shorter length. The quick discharge faucet valve 100 comprises a shaft 102 of a predefined length to be inserted into the valve opening 103 of the faucet 101 of shorter length, for example, the shaft 102 used here is of a shorter length which is inserted into shorter faucet 101. This type of short shaft 102 is generally used for applications where the faucet 101 length is short, and this shaft 102 applies pressure against the seal assembly 105 to selectively discharge water through the discharge opening 104 of the short faucet 101. The opening and closing of the rotary handle 108 allows the selective discharge of water through the discharge opening 104.

The outer body of the quick discharge faucet valve 100 and its inner replaceable core is made of, for example, about 90 percentage (%) plastic, and it comes in lengths of 6-8-10-12 inches long with approximately 9/16 inches in diameter, and is 6×32×1/4-inch. The rubber washers 116 and 123, and metal washers 114, 115, 121, and 122, and the coiled spring member 106 are held in place by the 6×32× 1/4-inch metal screws. The quick discharge faucet valve 100 with the lockable adaptor assembly defined by the rotary handle 108 and the coupling member 107 can replace all existing outside rotatable house faucets, along with its inner core for long or short stem applications.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A quick discharge faucet valve is configured to discharge a fluid from a faucet connected to a pipe carrying the fluid, the quick discharge faucet valve comprising:
   a shaft inserted through an opening of the pipe, and a valve opening positioned proximal to a discharge opening of the faucet;
   a seal assembly fastened at an inner distal end of the shaft, wherein the seal assembly abuts against a joint connecting the faucet to the pipe, wherein the seal assembly is releasably positioned at the joint via a spring member;
   a coupling member disposed at an outer distal end of the shaft, and fastened to the faucet, wherein the coupling member couples the faucet with a rotary handle; and
   the rotary handle fastened to the coupling member, wherein a first interlocking member extending from the rotary handle is configured to interlock with a second interlocking member extending from the coupling member, wherein the rotary handle is rotated to unlock the first interlocking member from the second interlocking member, and the rotary handle is pulled to release the shaft and the seal assembly from the joint to allow the fluid to flow around the shaft, and further allows the fluid to be discharged at the discharge opening of the faucet.

2. The quick discharge faucet valve of claim 1, wherein the fluid flow through the faucet is closed by pushing and rotating the rotary handle to lock the first interlocking member and the second interlocking member, wherein the shaft is pushed against the seal assembly to seal the flow of the fluid.

3. The quick discharge faucet valve of claim 1, wherein the seal assembly comprises a pair of steel washers sandwiching a rubber washer therebetween.

4. The quick discharge faucet valve of claim 3, further comprising a first sleeve fastened to the outer distal end of the shaft via a threaded nut, wherein the first sleeve is configured to house the spring member and the seal assembly.

5. The quick discharge faucet valve of claim 4, further comprising an adjustable bolt engaged within the threaded nut, wherein the adjustable bolt extends the shaft towards the seal assembly and applies pressure on the pair of steel washers sandwiching the rubber washer.

6. The quick discharge faucet valve of claim 1, further comprising a coupling seal positioned adjacent to the coupling member, and inserted over the shaft, wherein the coupling seal comprises a pair of steel washers sandwiching a rubber washer therebetween.

7. The quick discharge faucet valve of claim 6, further comprising a second sleeve positioned on the shaft, and positioned adjacent to the coupling seal, wherein the second sleeve prevents the shaft from penetrating through the coupling seal.

* * * * *